(12) United States Patent
Brand

(10) Patent No.: US 6,619,429 B1
(45) Date of Patent: Sep. 16, 2003

(54) LUBRICATING DEVICE

(75) Inventor: Stefan Brand, Bad Kissingen (DE)

(73) Assignee: perma-tec GmbH & Co. KG, Euerdorf (DE)

( * ) Notice: Subject to any disclaimer, the term of this patent is extended or adjusted under 35 U.S.C. 154(b) by 66 days.

(21) Appl. No.: 09/669,528

(22) Filed: Sep. 26, 2000

(30) Foreign Application Priority Data

Sep. 27, 1999 (DE) ..................................... 299 16 916 U

(51) Int. Cl.[7] ................................................. B61K 3/02
(52) U.S. Cl. ........................................................ 184/3.1
(58) Field of Search ..................... 184/3.1, 3.2, 21–24, 184/100–102, 105.1–105.3

(56) References Cited

U.S. PATENT DOCUMENTS

| | | | | |
|---|---|---|---|---|
| 1,111,308 A | * | 9/1914 | Kincaid et al. | 184/3.2 |
| 1,226,927 A | * | 5/1917 | Tisher | 184/3.2 |
| 1,497,177 A | * | 6/1924 | Long | 184/3.2 |
| 1,713,924 A | * | 5/1929 | Seiders | 184/3.2 |
| 1,748,028 A | * | 2/1930 | Rickard | 184/3.2 |
| 1,934,175 A | * | 11/1933 | Elmer | 184/3.1 |
| 1,936,481 A | * | 11/1933 | Miller | 184/3.1 |
| 1,940,527 A | * | 12/1933 | Bolt | 184/3.1 |
| 1,954,990 A | * | 4/1934 | Elmer | 184/3.1 |
| 1,967,474 A | * | 7/1934 | Hoofer | 184/3.1 |
| 2,018,402 A | * | 10/1935 | Humphries et al. | 184/3.1 |
| 2,212,734 A | * | 8/1940 | Guffra | 184/3.2 |
| 2,285,082 A | * | 6/1942 | Bolt | 184/3.1 |
| 2,727,589 A | * | 12/1955 | Campney | 184/3.2 |
| 2,866,521 A | * | 12/1958 | Gibson | 184/3.2 |
| 3,011,590 A | * | 12/1961 | Ouellette | 184/3.2 |
| 3,144,915 A | * | 8/1964 | Burrell | 184/3.2 |

FOREIGN PATENT DOCUMENTS

EP        0 845 631        11/1997

* cited by examiner

*Primary Examiner*—Chong H. Kim
(74) *Attorney, Agent, or Firm*—Collard & Roe, P.C.

(57) ABSTRACT

The invention relates to a lubricating device for applying lubricant to the wheel flange of a running wheel, or to the side surface of a running rail. The lubricating device has a lubricating head that is guided with axial displaceability and is acted upon by a pressure spring. This lubricating head rests against the surface to be lubricated under the action of the pressure spring. This lubricating head has a dispensing opening for dispensing lubricant, which is fluidly connected with a lubricant hose or a lubricant dispenser.

9 Claims, 2 Drawing Sheets

LUBRICATING DEVICE

BACKGROUND OF THE INVENTION

1. Field of the Invention

This invention relates to a lubricating device for applying a lubricant to a wheel flange of a running wheel, or to a side surface of a running rail. The lubricant is frequently necessary to compensate for axial displacements of components in a crane of a few millimeters to a few centimeters, and may constantly change.

2. The Prior Art

Wheel flanges and rails on traveling cranes are subjected to high wear, especially when the traveling cranes are used in a highly polluted or dusty environment. Effective lubrication of the wheel flanges and/or side surfaces of the rails is required to reduce wear. With known spraying devices for lubricating wheel flanges and rails with oil, it is not possible to control the film of oil disposed on the vertical surfaces that have to be lubricated. A problematic coating of lubricant forms over time on the running surface of the rail. This coating may cause a slipping of the driven running wheels and consequently impair the operation of the traveling crane.

There are known devices for applying dry lubricants which are used for the practical application of lubricating wheel flanges. These devices have a solid piece of lubricant consisting of a synthetic carbon/graphite mixture that abuts the wheel flange of a running wheel with application of the force of a spring. The abrasion of the lubricating piece forms a graphite coating on the sliding surfaces oat the wheel flange and running rails. The amount of lubricant dispensed is dependent upon the spring force and cannot be controlled.

SUMMARY OF THE INVENTION

The invention relates to a lubricating device that provides for the precise dispensing of oil- and grease-containing lubricants to the wheel flange of a running wheel or to the side surface of a running rail. This lubricating device is designed to have the running surfaces of the running wheel and rails free of lubricant.

The object of the invention and solution of this problem is to provide a lubricating device with a lubricating head that is guided in an axially displaceable manner and acted upon by a pressure spring. The pressure spring acts upon the lubricating head which rests against a surface to be lubricated. The lubricating head has a dispensing opening for dispensing lubricant, and it is connected with a lubricant hose or a lubricant dispenser. The lubricating device as defined by the invention can be connected via a lubricating hose with a central lubrication system having a metering pump that supplies the wheel flanges of all running wheels with lubricant. Furthermore, a lubricant dispenser is directly connected to the lubricating head, or with interconnection of a short connection element. This lubricant dispenser automatically dispenses the lubricant in metered amounts. The lubricant dispensers preferably comprise a lubricant supply reservoir, a setting spindle and a piston, as well as an electronically controlled motor drive that triggers the setting movements of the piston at preset time intervals. A lubricant-dispensing device of this type is known from EP 0 845 631 A1. With the help of a running wheel monitoring device is it also possible to couple the dispensing of the lubricant also to the operation of the device to be lubricated.

The present invention contains several different embodiments. In a preferred embodiment, the lubricating head is axially displaceable with torsional strength in a housing. This lubricating head has a permanently connected tube that is movably guided in an axial bore of the housing. There is also a connecting element for connecting a lubricant hose or a lubricant dispenser to the end of the tube projecting from the housing. There is a stop element disposed adjacent to the connecting element, that limits the position of the lubricating head which may be adjustably arranged on the end of the tube located on the outer side of the housing. The housing is preferably equipped with means for adjustably securing it on a holding means.

If the lubricating device is used for lubricating the wheel flange of a running wheel, or for the lubrication of the side surface of a running wheel, the longitudinal axis of the lubricating head is preferably aligned at an acute angle in relation to the surface to be lubricated. This device is aligned in such a manner to preserve space. With this alignment, the angle has to be coordinated according to the laws of trigonometry, with the possible stroke of the lubricating head during operation, and with the width of the trace of lubricant to be applied. The lubricating device can compensate any constantly changing axial displacement of up to several centimeters of the parts to be lubricated.

The dispensing end of the lubricating head preferably has a flat support surface for contacting the surface to be lubricated. Depending on the type of lubricant used, it may be useful also to design the dispensing end with a wedge-shaped support surface that favors the formation of a lubricant wedge behind the dispensing opening. The dispensing end of the lubricating head may have longitudinal grooves and/or transverse grooves for distributing the lubricant. The dispensing end of the lubricating head contains a distributing groove that is aligned parallel with the direction of movement of the surface to be lubricated. With the help of the distributing groove, the lubricant can be applied to the surface to be lubricated in a targeted manner. Thus, soiling or encrusting of the dispensing opening can be prevented.

BRIEF DESCRIPTION OF THE DRAWINGS

FIG. 3A is a perspective view of another embodiment of the invention wherein there is shown a lubricating head having a series of longitudinal or transverse grooves for distributing lubricant.

DETAILED DESCRIPTION OF THE PREFERRED EMBODIMENT

Figure 1:
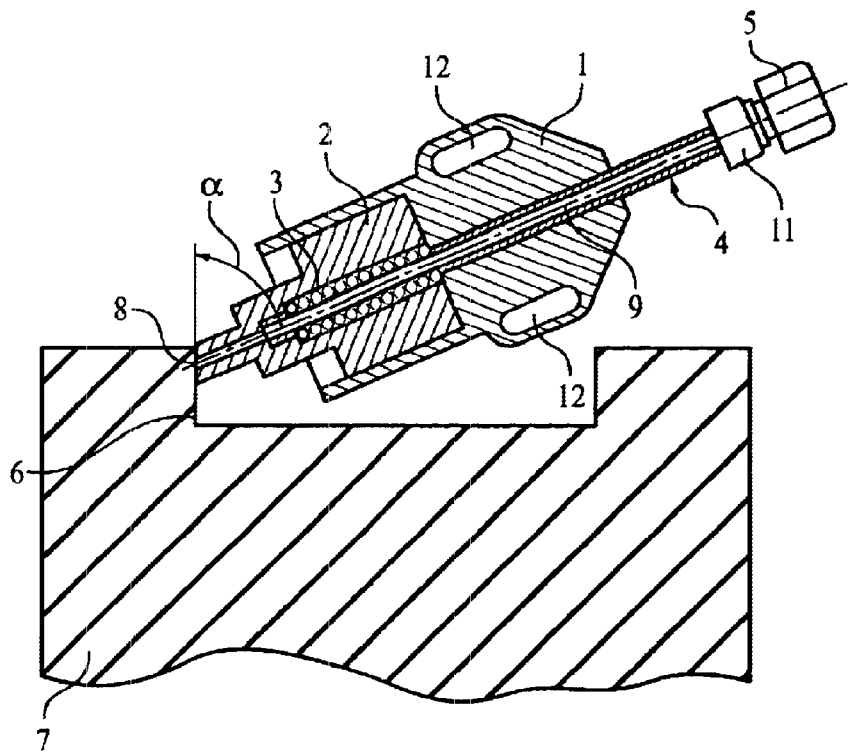
FIG. 1 is a longitudinal cross-sectional view through a lubricating device of the invention for lubricating the running flange of a running wheel.

Referring to the drawings, FIG. 1 shows a lubricating device for lubricating wheel flanges especially on traveling cranes. The basic structure of the lubricating device comprises a housing 1, a lubricating head 2 that is axially displaceable and supported within housing 1 with torsional strength, a pressure spring 3 acting upon lubricating head 2, and a tube 4 that is permanently connected with lubricating head 2 and movably guided in an axial bore of housing 1. A connecting element 5, for connecting a lubricant hose or a lubricant dispenser, is connected to the end of tube 4 projecting from housing 1. Lubricating head 2 is acted upon by pressure spring 3, and rests against surface 6 to be lubricated, which is the wheel flange of a running wheel 7. Lubricating head 2 has a dispensing opening 8 for dispensing the lubricant fed via tube 4. Lubricating oils or lubricating greases are used as lubricants.

Figure 2:
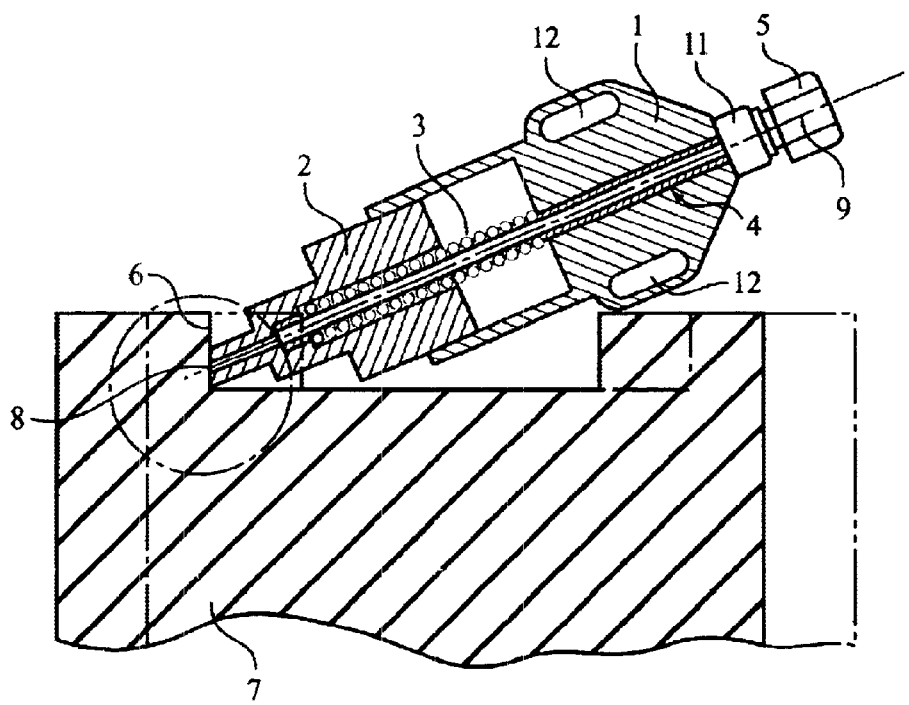
FIG. 2 shows the device of FIG. 1, whereby the running wheel is axially displaced with respect to the arrangement of FIG. 1.

Longitudinal axis 9 of lubricating head 2 is aligned with surface 6 to be lubricated at an acute angle. A comparative consideration of FIGS. 1 and 2 shows that the angle is coordinated in accordance with the rules of trigonometry with the possible stroke of lubricating head 2 when in operation, and with the width of the lubricating trace to be applied. The lubricating device, being spring loaded, is capable of compensating the constantly changing axial displacement up to a few centimeters.

The space for receiving the housing 1 for lubricating head 2 is not designed in a cylindrical form. Rather, this space has bridges for securing the lubricating head 2 against rotation, or has a shape deviating from the cylindrical form. For example, the shape could be a rectangularly shaped inner contour. Pressure spring 3 is arranged concentrically in relation to the longitudinal axis of the lubricating head. Pressure spring 3 applies pressure against lubricating head 2 to push the lubricant out of dispensing opening 8 onto surface 6. There is a stop element 11 for limiting the setting stroke of the lubricating head 2 located at the end of the tube on the outside of the housing. This stop element is adjustable for easier adjustment of the lubricating device. Stop element 11 may also be connected with connecting element 5. Housing 1 is equipped with oblong holes 12 or similar means for securing it on a holding means in an adjustable manner.

Figure 3:
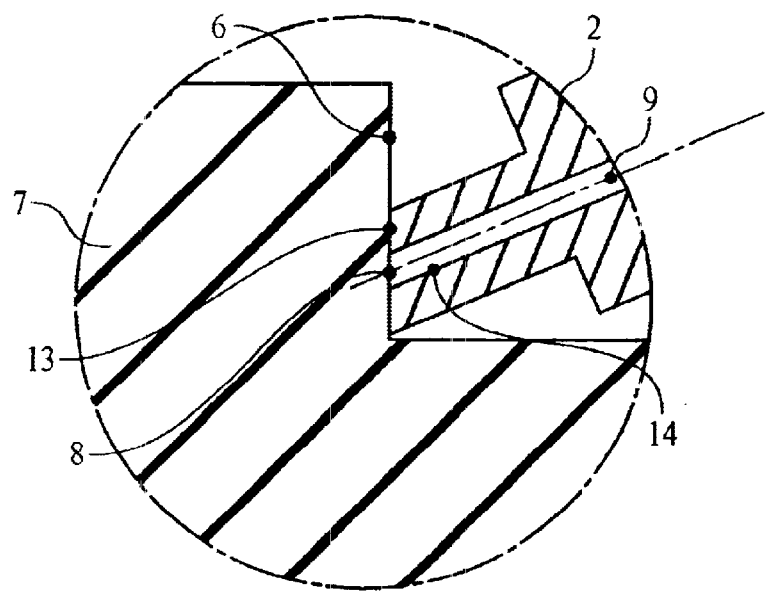
FIG. 3 is an enlarged cutout view taken from FIG. 2.
Figure 4:
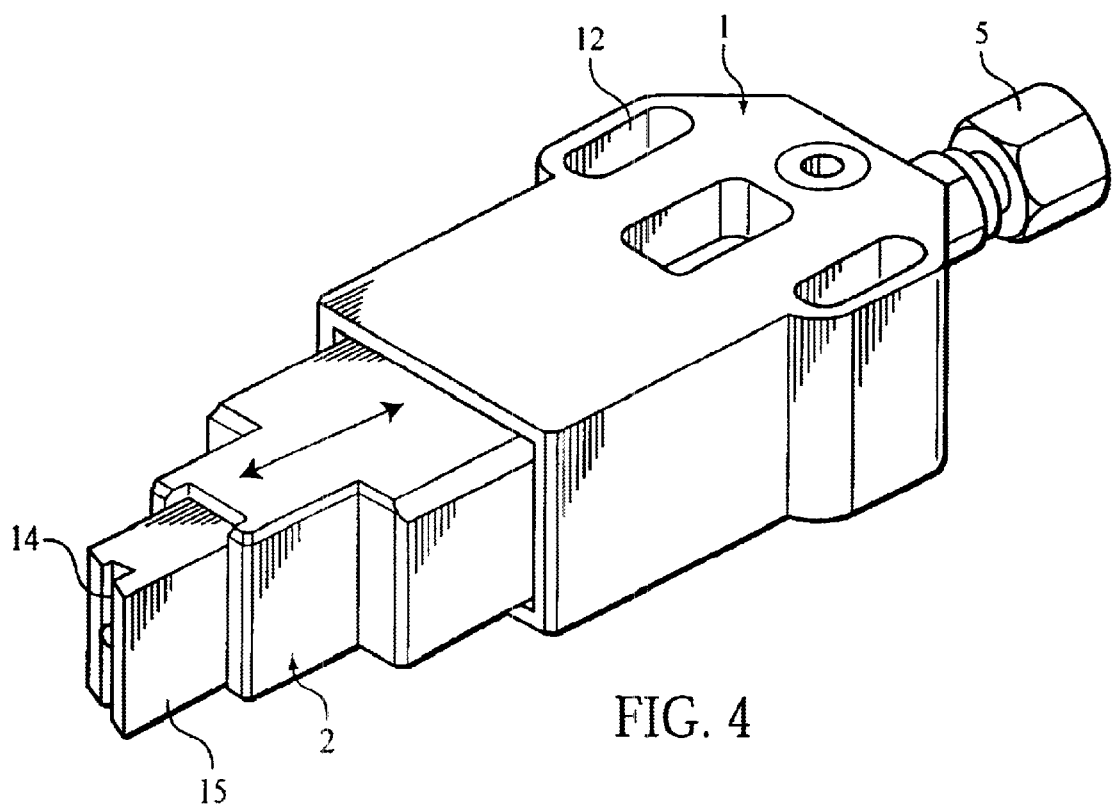

FIG. 3 shows the dispensing end of lubricating head 2 having a flat support surface 13 for contacting surface 6 to be lubricated. Furthermore, a distributing groove 14 is worked into support surface 13. With this design, the groove is aligned parallel with the direction of movement of the surface 6 to be lubricated. With the help of the distributing groove 14, the lubricant can be applied to surface 6 to be lubricated in a targeted manner. Thus, soiling or encrusting of dispensing opening 8 can be prevented. In addition, the dispensing end of the lubricating head can be designed with transverse grooves, or with a combination of longitudinal and transverse grooves.

FIG. 3A shows a perspective view of lubricating head 2 having longitudinal or transverse grooves for distributing the lubricant. In addition, the dispensing end of lubricating head 2 has a distributing groove 14 aligned parallel with the direction of movement of surface 6 which is to be lubricated.

Lubricating head 2 is supported on a pressure spring 3, which is designed as a separate part. Lubricating head 2 or housing 1 can also be designed in the form of an injection-molded part which contain molded-on spring elements provided for elastically supporting the lubricating head.

The lubricating device as defined by the invention dispenses oil- or grease-containing lubricants in a controlled and localized manner. Because the lubricating head is designed as elastic, it is possible to compensate axial displacement of the part to be lubricated. The device as defined by the invention is especially suited for lubricating the wheel flanges of running wheels, and also for the rough operation on traveling crane gear. With the help of a proper holding device, it is also possible to connect two lubricating devices with each other so that each lubricating device lubricates a wheel surface of the same wheel.

What is claimed is:

1. A lubricating device for applying lubricant to a surface of a wheel flange or the side surface of a running rail connected to a lubricant hose for lubricant supply, the device comprising:

an axially displaceable guided lubricating head wherein said lubricating head rests against, and is axially displaceable against the wheel flange;

a dispensing opening disposed on one end of said lubricating head and positioned in contact with the wheel flange for dispensing lubricant onto the surface;

a pressure spring disposed on an opposite end of said lubricating head for urging said lubricating head against the surface during an application of lubrication to the surface;

a housing arranged beside the wheel flange of a running wheel said housing having an axial bore for slideably receiving said lubricating head and wherein the lubricating head rests against the surface to be lubricated;

a tube slidably disposed within said housing having one end connected to said lubricating head and an opposite end fixedly connected to the lubricant supply, wherein said pressure spring surrounds said tube within said lubricating head and said housing and allows said lubricating head and said dispensing opening to be axially displaced in the direction of the surface to be lubricated; and a connecting element, disposed on said lubricant supply end of said tube, said connecting element for connecting the lubricant hose to said tube.

2. The lubricating device according to claim 1, further comprising a stop element adjustably disposed on the supply end of said tube for limiting the displacement of said lubricating head within said bore of said housing.

3. The lubricating device according to claim 1, wherein said housing comprises apertures for adjustably securing said housing on a holding device.

4. The lubricating device according claim 1, wherein a longitudinal axis of said lubricating head is aligned at an acute angle in relation to the surface to be lubricated.

5. The lubricating device according to claim 1, wherein a dispensing end of said lubricating head has a flat support surface for contacting with the surface to be lubricated.

6. The lubricating device according to claim 1, wherein a dispensing end of said lubricating head has a wedge-shaped support surface forming a lubricant wedge behind said dispensing opening.

7. The lubricating device according to claim 1, wherein a dispensing end of said lubricating head has a distributing groove which is aligned parallel with a direction of movement of the surface to be lubricated.

8. The lubricating device according to claim 1, wherein said pressure spring is arranged concentrically along a longitudinal axis of said lubricating head.

9. A lubricating device for applying lubricant to a surface of a wheel flange or the side surface of a running rail connected to a lubricant hose for lubricant supply, the device comprising:

- an axially displaceable guided lubricating head wherein said lubricating head is axially displaceable against the wheel flange;
- a dispensing opening disposed on one end of said lubricating head for dispensing lubricant onto the surface;
- a pressure spring disposed on an opposite end of said lubricating head for urging said lubricating head against the surface during an application of lubrication to the surface;
- a housing having an axial bore for slideably receiving said lubricating head said housing having a plurality of oblong holes for securing said housing to a holding means;
- a tube slidably disposed within said housing having one end connected to said lubricating head and an opposite end fixedly connected to the lubricant supply, wherein said pressure spring surrounds said tube within said lubricating head and said housing and allows said lubricating head and said dispensing opening to be axially displaced in the direction of the surface to be lubricated; and
- a connecting element, disposed on said lubricant supply end of said tube, said connecting element for connecting the lubricant hose to said tube.

* * * * *